United States Patent [19]

Dean et al.

[11] Patent Number: 5,286,778
[45] Date of Patent: Feb. 15, 1994

[54] LATICES AND WATERBORNE COMPOSITIONS FOR WOOD STAINS, SEALERS, AND THE LIKE

[75] Inventors: Roy E. Dean, Lower Burrell; Edward E. McEntire, Allison Park, both of Pa.

[73] Assignee: PPG Industries, Inc., Pittsburgh, Pa.

[21] Appl. No.: 951,619

[22] Filed: Sep. 28, 1992

[51] Int. Cl.$^5$ ............... C08L 27/08; B32B 21/08
[52] U.S. Cl. ........................ 524/460; 428/537.1
[58] Field of Search ............... 524/460; 428/537.1

[56] References Cited

U.S. PATENT DOCUMENTS

| | | |
|---|---|---|
| 3,776,752 | 12/1973 | Craven . |
| 4,009,138 | 2/1977 | Kobashi et al. . |
| 4,064,087 | 12/1977 | Das . |
| 4,066,595 | 1/1978 | Bunge . |
| 4,092,287 | 5/1978 | Ito et al. . |
| 4,151,143 | 4/1979 | Blank et al. . |
| 4,187,072 | 2/1980 | Fernandez . |
| 4,432,797 | 2/1984 | Vasishth et al. . |
| 4,440,897 | 4/1984 | Maska . |
| 4,477,282 | 10/1984 | Fernandez . |
| 4,479,825 | 10/1984 | Fernandez . |
| 4,489,002 | 12/1984 | Baumann et al. . |
| 4,507,425 | 3/1985 | Weaver . |
| 4,519,174 | 5/1985 | Witt . |
| 4,638,022 | 1/1987 | Cope . |
| 4,642,323 | 2/1987 | Ranka et al. . |
| 4,647,612 | 3/1987 | Ranka et al. . |
| 4,716,060 | 12/1987 | Rajadhyaksha et al. . |
| 4,722,854 | 2/1988 | Cope . |
| 4,913,972 | 4/1990 | Grunewalder et al. . |
| 4,976,782 | 12/1990 | Crozer . |

FOREIGN PATENT DOCUMENTS 878572  8/1971  Canada .

*Primary Examiner*—Veronica P. Hoke
*Attorney, Agent, or Firm*—Dennis G. Millman

[57] ABSTRACT

Latex copolymers of vinyl halide and vinylidene halide reacted in the presence of a polymeric surfactant are advantageously employed as binders in waterborne stains and other coating compositions. Monomers from which the latex is polymerized may additionally include acrylates, vinyl esters, and/or unsaturated epoxies.

25 Claims, No Drawings

LATICES AND WATERBORNE COMPOSITIONS FOR WOOD STAINS, SEALERS, AND THE LIKE

BACKGROUND OF THE INVENTION

This invention relates to latex polymers and compositions incorporating such latices adapted for staining and/or sealing porous substrates such as wood.

Reduction of the amounts of organic solvents in coating compositions has been a desirable objective for the sake of reducing the amount of volatile organics released into the atmosphere. Therefore, waterborne coating compositions have come into widespread use. Waterborne stains have also been proposed (e.g., U.S. Pat. Nos. 4,432,797 and 4,976,782), but providing acceptable performance with a waterborne stain has generally been hampered by the tendency of water to raise the grain of the wood to which a waterborne stain is applied. Another problem is that in some cases the water soluble dyes that are used in waterborne stains can be redissolved by subsequently applied waterborne coatings.

In order to provide a barrier to hold out subsequently applied coatings, it is desirable for the stain to include a resin that at least partially seals the wood surface. Resins proposed for this purpose include aqueous polyvinyl chloride latex (e.g., "GEON" from B. F. Goodrich Co.), but they are not as satisfactory as would be desired because they require relatively high levels of organic solvent to aid coalescence of the latex particles to form a film, thereby limiting the reduction in volatile organic content. A further disadvantage is that the water-miscible organic solvents that are included for the sake of coalescence tend to increase penetration of the water into the wood, thereby worsening grain raising. Additionally, the prior art vinyl latex tends to be milky in appearance initially after spraying onto a substrate, which is undesirable because the applicator cannot observe the effect of the composition on the substrate so as to correct any deficiencies. The inclusion of ammonia or amines in prior art waterborne compositions is also believed to worsen the grain raising problem.

Additional features that are desirable in a stain composition include application properties such as low drag and workability, i.e., the ability to wipe the stain for a period of time before drying. One prior art approach to reduce grain raise is to increase the amount of pigment in the stain composition, but this tends to speed the drying rate, thereby undesirably decreasing the working time. It is known that the drying rate can be retarded by adding an oil to the composition, but the oil can have a negative effect on adhesion.

SUMMARY OF THE INVENTION

The present invention is a waterborne coating or stain composition that includes a copolymer of vinyl chloride and vinylidene chloride that is polymerized in a latex in two stages. The first stage provides a polymeric surfactant dispersed in water that forms the exterior shell of the latex particles, and the second stage polymerizes the vinyl chloride and vinylidene chloride in the core of the latex particles. The polymer of the shell of the latex particles has a low glass transition temperature ($T_g$) and is easy to coalesce relative to the polymer of the core, thereby reducing or eliminating the need for coalescing solvent. As a result, the composition may include volatile organic compounds (V.O.C.) in amounts less than 3 pounds per gallon (360 grams per liter). When applied to wood, the composition has surprisingly been found to cause little or no grain raising. Furthermore, the composition is transparent (i.e., not milky) upon spraying, has good working time and low drag, and provides a good barrier to subsequently applied coatings. The barrier properties are particularly important in preventing subsequently applied coating compositions from penetrating into previously applied coatings.

The waterborne compositions of the present invention do not require the inclusion of relatively large amounts of organic cosolvents or ammonia or amines for the sake of coalescing the latex particles. Therefore, superior performance with respect to grain raising of wood substrates can be achieved.

The good barrier performance of the compositions of the present invention is advantageously achieved with relatively low temperature curing. The use of a thermosetting crosslinking agent is not required by the present invention, so high activation temperatures are not required to cure the coating. Curing at room temperature or at moderate forced drying temperatures (e.g., 35° C. to 100° C.) is particularly advantageous with temperature-sensitive substrates such as wood.

The composition of the present invention may serve as a stain to be applied to bare wood or other porous substrates, or it may be used as a glaze to be applied over a base coat. The composition may also serve as sealer coating for wood or other porous surfaces.

Another aspect of the invention is the combination of the stain or glaze described above with subsequently applied, waterborne sealer coats and/or waterborne top coats to provide a complete coating system for wood or other porous substrates that has very low overall V.O.C. The good barrier properties of the latex resin of the present invention permits a wide choice of waterborne sealer and top coat compositions. Vinyl chloride based sealer coating compositions (e.g., those containing the same vinyl chloride/vinylidene chloride latex employed in the stain) are desirable in some cases because of their low cost, and the compositions of the present invention have been found to provide exceptionally good adhesion between vinyl chloride based stains and sealers. Even better adhesion can be attained with urethane containing top coats applied over the stain of the present invention. Advantageously there is little or no interference between water based urethanes and the stain composition of the present invention that would reduce the clarity of the finish.

DETAILED DESCRIPTION

The embodiments of the present invention that are described as "stains" are generally characterized by low solids contents relative to paint, i.e., less than 50 percent by weight solids. Stains are also characterized as being relatively transparent and adapted to penetrate porous substrates. Similar in composition, although somewhat different in function are glazes. A glaze is a semi-transparent colored coating that may be used to create an artificial wood grain appearance or other effect. The waterborne compositions of the present invention are particularly advantageous as stains and glazes, but the latex polymer composition of the present invention may also be used as the binder resin in other coatings such as sealer coatings which may have a higher solids content than stains.

The binder resin of the compositions of the present invention comprises a latex polymer which has been formed by free radical initiated copolymerization of vinyl halide monomers and vinylidene monomers in aqueous medium in the presence of a polymeric surfactant. The polymeric surfactant may be characterized as a salt of an acid group containing polymer. A two stage polymerization is used, whereby the polymeric surfactant is polymerized in the first stage, and the copolymerization of vinyl halide and vinylidene halide takes place in the second stage.

Polymeric surfactants suitable for use in the present invention and their preparation are disclosed in U.S. Pat. No. 4,647,612 (Ranka et al.). Among the acid-containing polymers which can be employed are virtually any acid-containing polymer which can be neutralized or partially neutralized with an appropriate basic compound to form a salt which can be dissolved or stably dispersed in an aqueous medium. Acid-containing polymers which may be employed include acid-containing acrylic polymers and copolymers, alkyd resins, polyester polymers and polyurethanes. Preferably, the polymeric surfactant is an acid-containing acrylic polymer prepared in the known manner by polymerizing an unsaturated acid, preferably an alpha, beta ethylenically unsaturated carboxylic acid with at least one other polymerizable monomer. Examples of suitable unsaturated acids include acrylic acid, methacrylic acid, crotonic acid, itaconic acid and $C_1$ to $C_8$ alkyl half-esters of maleic acid and fumaric acid including mixtures of acids. Examples of the other monomers to be polymerized with the unsaturated acids to produce the acid-containing acrylic polymers are alkyl acrylates and methacrylates, vinylidene halides, vinyl ethers, and vinyl esters.

Polymerization of the monomers to produce the polymeric surfactant is usually conducted by organic solution polymerization techniques in the presence of a free radical initiator as is well known in the art. The molecular weight of the resulting acid-containing acrylic polymers is usually between about 2000 to 150,000 (preferably 60,000 to 120,000) on a weight average molecular weight basis, and the polymers have acid numbers between 30 and 250. The salt or partial salt of the acid-containing polymer is formed by neutralizing or partially neutralizing the acid groups of the polymer with an appropriate basic compound. Suitable basic compounds which may be utilized for this purpose include inorganic bases such as alkali metal hydroxides, for example, sodium or potassium hydroxide, or ammonia, or organic bases such as water soluble amines, e.g., methylethanolamine or diethanolamine. The degree of neutralization required to form the desired polymer salt may vary considerably depending upon the amount of acid included in the polymer and the degree of solubility or dispersibility of the salt which is desired. Ordinarily in making the polymer water-dispersable the acidity of the polymer is at least 25 percent neutralized with the basic compound.

Unsaturated monomers that are copolymerized in the presence of the polymeric surfactant described above to produce the core of the latex particles include vinyl halide and vinylidene halide, preferably vinyl chloride and vinylidene chloride. The combination of the two monomers was found to be important for application to wood because vinyl chloride alone is relatively brittle and does not yield the adhesion to wood that is desired. Vinylidene chloride alone, on the other hand, tends to produce films that turn yellow and not suitable for clear finishes. In some embodiments of the invention, vinyl chloride and vinylidene chloride constitute the only copolymerizable monomers employed, and the relative amounts of each may range from 9:1 to 1:2, preferably 5:1 to 1:1, most preferably 4:1 to 2:1 on a weight basis. Expressed differently, the monomer feed may include 25 to 90 (preferably 40 to 80) percent by weight vinyl halide and 10 to 50 (preferably 10 to 40) percent by weight vinylidene halide.

In some embodiments it has been found useful to include additional copolymerizable, unsaturated monomers other than vinyl halide and vinylidene halide to make the core. These additional monomers include alkyl acrylates and methacrylates (e.g., ethyl acrylate, methyl methacrylate, butyl acrylate, butyl methacrylate, lauryl acrylate, and mixtures thereof) and vinyl esters (e.g., vinyl acetate and vinyl versatate) and serve to reduce yellowing of the coating. When such an additional monomer is employed, it may constitute up to about 40 percent, preferably 5 to 30 percent, to the monomer composition from which the core is polymerized.

In preferred embodiments the copolymerization mixture of vinyl chloride and vinylidene chloride may additionally contain an epoxy group containing alpha-beta unsaturated monomer, which is believed to link the core to the shell and appears to contribute to the clarity of the compositions. Examples of the epoxy group containing monomer include glycidyl acrylate, glycidyl methacrylate, and allyl glycidyl ether. The amount of the epoxy group containing monomer to be included with the copolymerizable monomers may range from 0 to 30 percent by weight, preferably 0.1 to 20 percent by weight of the monomers used to produce the core of the latex.

The vinyl halide and vinylidene halide, preferably vinyl chloride and vinylidene chloride, are copolymerized in aqueous medium with a free radical initiator in the presence of the polymeric surfactant. Relative to the total polymeric content of the latex, the polymeric surfactant may constitute 5 to 50 percent by weight of resin solids, preferably 25 to 50 percent. At the preferred amounts of polymeric surfactant stability of the latex can be maintained at relatively low acid values, thereby providing good water resistance in the cured coating.

The temperature of the latex polymerization is typically from 0° C. to 100° C., usually from 20° C. to 85° C. The pH of the medium is usually maintained from about 5 to about 12. The free radical initiator can be selected from one or more peroxides which are known to act as free radical initiators and which are soluble in aqueous media. Examples include the persulfates such as ammonium, sodium, and potassium persulfate. Also, oil soluble initiators may be employed either alone or in addition to the water soluble initiators. Typical oil soluble initiators include organic peroxides such as benzoyl peroxide, t-butyl hydroperoxide, and t-butyl perbenzoate. Azo compounds such as azobisisobutyronitrile can also be used.

For the vinyl halide and vinylidene halide copolymerization the reactor is typically charged with an appropriate amount of water, polymeric surfactant, and free radical initiator. The reactor is then heated to the free radical initiation temperature and charged with the copolymerizable monomers. Preferably only water, initiator and part of the polymeric surfactant and part of the copolymerizable monomers are initially charged to the reactor. After this initial charge has been allowed to react for a period of time, the remaining monomer component and polymeric surfactant are added incrementally with the rate of addition being varied depending on the polymerization temperature, the particular initiator employed, and the type and amount of monomers being polymerized. After all the monomer components have been charged, a final heating is usually done to complete polymerization. The reactor is then cooled, and the latex recovered. The following examples illustrate specific embodiments of the invention.

The latex particles herein have been referred to as having a "core" and a "shell." It should be noted that while there is evidence indicating that the product of the first stage polymerization becomes located on the exterior of the final latex particle and that the product of the second stage polymerization becomes located in the interior of the latex particle, the "core" and "shell" designations are theoretical and that the actual existence of a discrete core and a shell and the identity of the polymer species in each is not critical to the performance of the present invention. It appears that the order of the polymerization stages is a more significant factor in determining properties of the coating than the theoretical morphology of the latex particles.

The major solvent of the compositions of the present invention is water, but minor amounts of organic solvents may be present within the meaning of "waterborne." Inclusion of small amounts of organic solvents (e.g., acetone) may be beneficial for reducing grain raise. However, the amounts of organic solvents are generally minimized for the sake of minimizing V.O.C. Preferred embodiments of the compositions of the present invention have V.O.C. less than 3, most preferably less than 2.6.

For use as a stain or glaze the compositions of the present invention contain at least one colorant. Colorants for use in this type of composition are well known to those of skill in the art and include pigments (organic or inorganic) and dyes. Inorganic pigments include metal oxides such as the oxides of iron, titanium, zinc, cobalt, and chrome. Earth colors may employ mineral pigments obtained from clay. Various forms of carbon may be used for black coloration. Organic pigments are typically insoluble and are derived from natural or synthetic materials, and include phthalocyanine, lithos, toluidine, and para red. Organic pigments may be employed in a precipitated form as a lake. Dyes encompass a wide variety of organic materials that may be used in stain compositions, e.g., acid dyes. Dyes that are water soluble particularly lend themselves to use in the stain compositions of the present invention.

The following latex examples illustrate embodiments of vinyl halide/vinylidene halide copolymerized latices that may be used in the stain compositions of the present invention.

LATEX EXAMPLE 1

Into a 1 gallon stainless steel pressure reactor was charged 1608 grams of a 24.8% solids dispersion of an acrylic polymer {70% ethyl acrylate (EA), 13% styrene, 5% hydroxyethyl methacrylate (HEMA), 12% acrylic acid, molecular weight ($M_w$) 80,000, 70% of the acid neutralized with ammonia}, 652 grams of deionized water, 18.38 grams of Pluronic ® F-68 nonionic surfactant available from BASF-Wyandotte, and a solution of 2.76 grams ammonium persulfate and 300 grams deionized water. The reactor is sealed and brought to 22° C. with stirring at 270 rpm and evacuated to about 4 pounds per square inch absolute. The reactor is repressured with nitrogen and the evacuation and repressurization repeated once, then evacuated to 4 pounds per square inch.

Subsequently charged to the vessel was 65 grams of vinyl chloride (VCM) and 65 grams of vinylidene chloride (VDC). The reactor contents are then heated to 65° C. and held at temperature for 20 minutes. Then 367 grams each of vinyl chloride and vinylidene chloride, along with 55.1 grams of glycidyl methacrylate (GMA) are fed into the reaction over 4 hours, and the stir rate adjusted to 370 rpm the second hour and 470 rpm the third hour. The contents are then held at temperature for 6.5 hours. The product is then vacuum stripped at 40° C. of volatile monomers after adding 100 grams deionized water.

The product had a final solids of 36.6% and viscosity of 246 centipoises (Brookfield Spindle #2 at 25° C.). Dried coagulum was 2.8 grams (after passing the product through a 200 mesh screen).

Latex Examples 2 through 8 were prepared in essentially the same manner as Latex Example 1, but with variations in the monomers as set forth in Table I, wherein the monomers are expressed as a percentage of the total monomer charge.

TABLE I

| | Monomers | | | | | | | |
|---|---|---|---|---|---|---|---|---|
| | VCM | VDC | BMA[a] | EA | GMA | LMA[b] | MMA[c] | SMBS[d] |
| Latex Example 2 | 48.5 | 48.5 | — | — | 3.0 | — | — | No |
| Latex Example 3 | 53.9 | 28.0 | — | 14.1 | 4.0 | — | — | Yes |
| Latex Example 4 | 48.0 | 28.0 | 20.0 | — | 4.0 | — | — | Yes |
| Latex Example 5 | 47.0 | 47.0 | — | — | 6.0 | — | — | No |
| Latex Example 6 | 38.8 | 58.2 | — | — | 3.0 | — | — | No |
| Latex Example 7 | 67.9 | 29.1 | — | — | 3.0 | — | — | No |
| Latex Example 8 | 48.5 | 38.5 | — | — | 3.0 | 6.0 | 4.0 | No |

| | Latex Properties | | |
|---|---|---|---|
| | Solids | Viscosity | Coagulum[e] |
| Example 2 | 34.5 | 59.3 | <0.05 |
| Example 3 | 37.7 | 30.8 | 0.49 |
| Example 4 | 36.1 | 60.1 | 0.08 |
| Example 5 | 36.6 | 246 | 2.81 |
| Example 6 | 37.2 | 130 | 0.17 |
| Example 7 | 36.4 | 111 | 0.04 |

TABLE I-continued

| Example 8 | 36.7 | 135 | 0.26 |

$^a$BMA = n-butyl methacrylate
$^b$LMA = lauryl methacrylate
$^c$MMA = methyl methacrylate
$^d$SMBS = sodium metabisulfite; If "yes", the polymerization procedure incorporated an additional step of pumping into the reactor during the final hour 50 grams of a 4.04% solution of SMBS in water.
$^e$Retained on 200 mesh screen and dried.

COMPARATIVE TESTS

Several waterborne resins were tested as binders in wood stains and compared to the performance of compositions of the present invention. The formulations of the stains tested are set forth in Table II, and the results are reported in Table III. Performance properties that are sometimes difficult to attain with waterborne stains relative to solvent based compositions include color development, workability, stability, and grain raise. These properties were evaluated after spraying the stain onto oak veneer plywood.

TABLE II

| | | Parts by Weight | | | | | |
|---|---|---|---|---|---|---|---|
| | | | | Colorant Dispersion | | | |
| Example | Resin Type | Resin$^1$ | Water | Umber$^9$ | Brown$^{10}$ | Yellow$^{11}$ | Red$^{12}$ |
| A | Latex Example 2 | 41.6 | 100 | 14.2 | 7.1 | 1 | 1 |
| B | Latex Example 3 | 41.6 | 100 | 14.2 | 7.1 | 1 | 1 |
| C | Latex Example 4 | 41.6 | 100 | 14.2 | 7.1 | 1 | 1 |
| D | Polyurethane$^2$ | 46.4 | 100 | 14.7 | 7.3 | 1.1 | 1.1 |
| E | Acrylic$^3$ | 35.7 | 100 | 13.6 | 6.8 | 0.9 | 0.9 |
| F | Polyester$^4$ | 50 | 100 | 15 | 7.5 | 1.2 | 1.2 |
| G | Acrylonitrile/ butadiene$^5$ | 32.1 | 100 | 13.2 | 6.6 | 0.9 | 0.9 |
| H | Styrene/butadiene/ vinyl pyridine$^6$ | 38.6 | 100 | 13.9 | 6.8 | 1 | 1 |
| I | Vinyl chloride$^7$ | 30 | 100 | 13 | 6.5 | 0.8 | 0.8 |
| J | Vinyl acetate$^8$ | 37.5 | 100 | 13.8 | 6.9 | 1 | 1 |

$^1$Total resin composition; selected to yield 15% by weight resin solids in the final stain compositions.
$^2$Prepared in accordance with U.S. Pat. No. 5,095,069.
$^3$"Neocryl A633" from ICI.
$^4$"Aq38D" from Eastman Chemical Co.
$^5$"Geon 1578X1" from B. F. Goodrich Co.
$^6$"Goodrite 2508" from B. F. Goodrich Co.
$^7$"Geon 460X74" from B. F. Goodrich Co.
$^8$"Ucar 376" from Union Carbide.
$^9$"CW5509" burnt umber colorant dispersion from Daniel Products Co.
$^{10}$"CW5516" VanDyke brown colorant dispersion from Daniel Products Co.
$^{11}$"CW5499" transparent red oxide colorant dispersion from Daniel Products Co.
$^{12}$"CW5600" transparent yellow oxide colorant dispersion from Daniel Products Co.

In each of Examples A through J the resin was first added to the water, followed by addition of the colorants with stirring. The colorant dispersions include pigments dispersed by blends of anionic and nonionic surfactants in a water and propylene glycol blend. Each composition was sprayed onto the surface of a 0.25 inch (6.4 millimeters) thick, five ply, polish sanded oak veneer. After application, each composition was permitted to stand for one minute before initial wiping, then permitted to stand an additional minute before fine wiping.

TABLE III

| | | | | Grain Raise | | |
|---|---|---|---|---|---|---|
| Composition | Stability | Color Development | Workability | Stained | Sealed | Topcoated |
| A | Passed | Passed | 3 | 3 | 3 | 3 |
| B | Passed | Passed | 3 | 3 | 3 | 3 |
| C | Passed | Passed | 3 | 3 | 3 | 3 |
| D | Passed | Passed | 4 | 3 | 3 | 2 |
| E | Passed | Failed | 4 | 3 | 3 | — |
| F | Passed | Passed | 4 | 2 | 2 | — |
| G | Failed | | | | | |
| H | Failed | | | | | |
| I | Passed | Passed | 3 | 3 | 3 | 1 |
| J | Passed | Passed | 3 | 2 | 2 | — |

"Color development" of a stain is the ability of the stain to highlight the grain and produce a uniform, aesthetically pleasing color. The performance evaluation for color development in these tests was "passed" or "failed." Color development was rated based on visual acceptability of the sealed stain, i.e., lack of muddiness, suitable clarity, adequate pore contrast.

"Workability" of a stain consists of several factors. First is the length of time that the stain remains wet and "workable" with wiping action. Another factor is the amount of drag or friction that is produced during the wiping action. The drag must be low enough that worker effort in staining large furniture pieces in a short period of time is not excessive. Workability is rated here on a scale of 1 to 5, where 5 is the best performance level (comparable to a high quality oil base stain), and 1 is poor performance. In these trials, the stain was initially wiped one minute after spraying, permitted to stand another minute, and then subjected to a fine wipe. Workability was evaluated during the fine wipe. Factors considered in the evaluation were color contrast in the pores, blotches due to premature drying, and the amount of resistance, drag, or stickiness while wiping.

"Stability" relates to the compatibility of the resin system with typical tints and pigments used to achieve the desired colors. Tinted resins were tested initially without additives, and if incompatibility resulted, additions of co-solvent were made in attempts to produce an acceptable stain. Stability is rated as "passed" or "failed" based on the ability of the particular resin to accept a typical tint combination.

"Grain raise" is the roughening of the surface that is produced by liquids, especially water, permeating into the wood surface. Grain raise was evaluated three times for each example: after applying the stain, after applying a sealer coat, and after applying a top coat. The sealer was a spray-applied, water based composition based on the same vinyl chloride/vinylidene chloride latex binder as contained in the stain compositions of the present invention. The top coat was an aqueous polyurethane composition of the type disclosed in U.S. Pat. No. 5,095,069 (Ambrose et al.). Grain raise was evaluated after each coat was dried at ambient temperature for 30 minutes. After the sealer coat dried, it was sanded with 280 grit stearated sandpaper prior to application of the topcoat. The most significant evaluation is that made after the top coat has been applied. The ratings are reported on a scale of 1 to 5, with 5 being the best performance level (comparable to a high quality oil base stain), and 1 is poor performance (like applying water onto an unprotected wood surface).

Although the invention has been described with reference to particular embodiments representing the best mode of the invention, it should be understood that variations and modifications as are known to those of skill in the art may be resorted to within the scope of the invention as defined by the claims that follow.

We claim:

1. An aqueous wood stain composition comprising:
   a latex polymer which comprises the free radical polymerization reaction product of vinyl halide and vinylidene halide in aqueous medium in the presence of polymeric surfactant;
   colorant;
   solvent, of which the major constituent is water, the amount of solvent being such that the solids content of the composition is less than 50 percent by weight.

2. The composition of claim 1 wherein the polymeric surfactant comprises neutralized, free radical polymerization reaction product of alpha, beta ethylenically unsaturated monomers, at least some of which include carboxylic acid groups.

3. The composition of claim 2 wherein the alpha, beta ethylenically unsaturated monomers from which the polymeric surfactant is polymerized include acrylic monomers.

4. The composition of claim 1 wherein the latex polymer comprises the free radical polymerization reaction product of vinyl halide and vinylidene halide in the proportions of 9:1 to 1:2 parts by weight vinyl halide to vinylidene halide.

5. The composition of claim 1 wherein the latex polymer comprises the free radical polymerization reaction product of vinyl halide and vinylidene halide in the proportions of 5:1 to 1:1 parts by weight vinyl halide to vinylidene halide.

6. The composition of claim 1 wherein the latex polymer comprises the free radical polymerization reaction product of vinyl halide and vinylidene halide in the proportions of 4:1 to 2:1 parts by weight vinyl halide to vinylidene halide.

7. The composition of claim 1 wherein the latex polymer comprises the free radical polymerization reaction product of the following monomers with relation to each other:
   25-90 parts by weight vinyl halide
   10-50 parts by weight vinylidene halide.

8. The composition of claim 1 wherein the latex polymer comprises the free radical polymerization reaction product of the following monomers with relation to each other:
   40-80 parts by weight vinyl halide
   10-40 parts by weight vinylidene halide.

9. The composition of claim 1 wherein the latex polymer comprises the reaction product of, in addition to the vinyl halide and vinylidene halide, an alpha, beta ethylenically unsaturated monomer containing an epoxy group.

10. The composition of claim 9 wherein the monomers from which the latex polymer is reacted include 0.1 to 20 percent by weight of the epoxy containing monomer.

11. The composition of claim 9 wherein the unsaturated epoxy monomer is selected from the group consisting of glycidyl acrylate, glycidyl methacrylate, and allyl glycidyl ether.

12. The composition of claim 9 wherein, in addition to the monomers previously recited, the latex polymer comprises the reaction product of a monomer selected from the group consisting of acrylates, vinyl ethers, vinyl esters, and mixtures thereof.

13. The composition of claim 12 wherein the monomers from which the latex polymer is reacted include 5 to 30 parts by weight of the monomer selected from the group consisting of acrylates, vinyl ethers, vinyl esters, and mixtures thereof.

14. The composition of claim 13 wherein the monomers from which the latex polymer is reacted include alkyl acrylate or alkyl methacrylate.

15. The composition of claim 7 wherein the vinyl halide is vinyl chloride and the vinylidene halide is vinylidene chloride.

16. The composition of claim 1 wherein the polymeric surfactant constitutes 25 to 50 percent by weight of the latex on a resin solids basis.

17. A composition comprising:
   a latex polymer which comprises the free radical polymerization reaction product of:
   25-90 parts by weight vinyl halide
   10-50 parts by weight vinylidene halide
   5-40 parts by weight of a monomer selected from the group consisting of acrylates and vinyl esters, and
   0.1-30 parts by weight unsaturated epoxy monomer
   in aqueous medium in the presence of polymeric surfactant; and solvent, of which the major constituent is water.

18. The composition of claim 17 wherein the latex polymer comprises the free radical polymerization reaction product of:
   40-80 parts by weight vinyl halide
   10-40 parts by weight vinylidene halide
   5-30 parts by weight of a monomer selected from the group consisting of acrylates and vinyl esters, and 0.1-20 parts by weight unsaturated epoxy monomer.

19. The composition of claim 17 wherein the vinyl halide is vinyl chloride, the vinylidene halide is vinylidene chloride, and the acrylic monomer is an alkyl acrylate or alkyl methacrylate.

20. The composition of claim 17 wherein the unsaturated epoxy monomer is selected from the group consisting of glycidyl acrylate, glycidyl methacrylate, and allyl glycidyl ether.

21. The composition of claim 17 wherein the polymeric surfactant constitutes 25 to 50 weight percent of the latex on a resin solids basis.

22. A coated wood product comprising:
   a wood substrate;
   a coating in which the major polymeric component is a latex polymer which comprises the free radical polymerization reaction product of:
      25-90 parts by weight vinyl halide
      10-50 parts by weight vinylidene halide
      5-40 parts by weight of a monomer selected from the group consisting of acrylates and vinyl esters, and
      0.1-30 parts by weight unsaturated epoxy monomer
   in aqueous medium in the presence of polymeric surfactant.

23. The coated wood product of claim 22 wherein the major polymeric component of the coating comprises the free radical polymerization product of:
      40-80 parts by weight vinyl halide
      10-40 parts by weight vinylidene halide
      5-30 parts by weight of a monomer selected from the group consisting of acrylates and vinyl esters,
      0.1-20 parts by weight unsaturated epoxy monomer, and
   in aqueous medium in the presence of polymeric surfactant.

24. The coated wood product of claim 23 wherein the polymeric surfactant comprises the neutralized, free radical polymerization reaction product of alpha, beta ethylenically unsaturated monomers, including acrylic monomers, and including carboxylic acid groups.

25. The coated wood product of claim 24 wherein the polymeric surfactant constitutes 25 to 50 weight percent of the polymeric component of the coating.

* * * * *